United States Patent [19]

Sonnenberg et al.

[11] Patent Number: 4,761,432
[45] Date of Patent: Aug. 2, 1988

[54] COATING OF FLAME RETARDANTS ONTO A SEED BEAD

[75] Inventors: Fred M. Sonnenberg, Merion; Dennis M. Hajnik, West Chester, both of Pa.

[73] Assignee: Arco Chemical Company, Newtown Square, Pa.

[21] Appl. No.: 121,253

[22] Filed: Nov. 16, 1987

[51] Int. Cl.$^4$ .......................... C08V 9/18; C08V 9/22
[52] U.S. Cl. ........................................ 521/60; 521/56; 521/88; 521/90; 521/98; 521/907; 521/59
[58] Field of Search ..................... 521/60, 56, 88, 907, 521/98, 90

[56] References Cited

U.S. PATENT DOCUMENTS

| | | | |
|---|---|---|---|
| 4,622,346 | 4/1986 | DiGuilio | 521/60 |
| 4,626,554 | 12/1986 | DiGuilio | 521/60 |
| 4,659,745 | 4/1987 | DiGuilio | 521/60 |
| 4,661,564 | 4/1987 | DiGuilio | 521/60 |
| 4,665,103 | 5/1987 | DiGuilio | 521/60 |
| 4,670,513 | 6/1987 | DiGuilio | 521/60 |
| 4,675,363 | 6/1987 | DiGuilio | 521/60 |
| 4,692,472 | 9/1987 | Ingram et al. | 521/60 |

*Primary Examiner*—Morton Foelak
*Attorney, Agent, or Firm*—Lewis J. Young

[57] ABSTRACT

Various flame retardant agents have been added as a coating to seed beads of vinyl aromatic polymers. The resulting products have high resistance to burning and permit the use of lower concentrations of the retardant.

52 Claims, No Drawings

COATING OF FLAME RETARDANTS ONTO A SEED BEAD

BACKGROUND OF THE INVENTION

This invention relates to molded thermoplastic foam.

More specifically, this invention pertains to molded thermoplastic foam which exhibits enhanced flame retardant properties.

The manufacture of molded articles from expanded thermoplastic particles is well known. The most commonly used thermoplastic particles are expandable polystyrene beads known as EPS. Typically, polystyrene beads are impregnated with a blowing agent which boils below the softening point of the polystyrene and causes the impregnated beads to expand when they are heated. When the impregnated beads are heated in a mold cavity, they expand to fill the cavity and fuse together to form a shaped article.

The formation of molded articles from impregnated polystyrene beads, is generally done in two steps. First, the impregnated polystyrene beads are pre-expanded to a density of from about 1 to about 3 pounds per cubic foot. Second, the pre-expanded beads are heated in a closed mold to further expand the pre-expanded beads and to form a fused article having the shape of the mold. The second step is generally referred to as molding.

The pre-expansion step is conventionally carried out by heating the impregnated beads using any conventional heating medium such as steam, hot air, hot water, or radiant heat. One generally accepted method for accomplishing the pre-expansion of impregnated thermoplastic particles is taught in U.S. Pat. No. 3,023,175 to Rodman.

There are two commonly used methods of incorporating flame retardant agents for use in expandable vinyl aromatic monomer polymers. The first method is the one step process where the flame retardant is added to the vinyl aromatic monomer during the suspension polymerization followed by the addition of the blowing agent. The second method is a two step process where the vinyl aromatic monomer is suspension polymerized to form hard polymer beads which are screened to the desired particle size. In the second step the beads are resuspended and the flame retardant and a blowing agent are added and incorporated during this impregnation.

SUMMARY OF THE INVENTION

It has now been found that if the flame retardant is added to the polymer beads from an emulsion of vinyl aromatic monomer and flame retardant that not only can the flame retardant be more or less uniformly dispersed throughout the bead or concentrated near or at the surface of the bead, but the flame retardant can be used at a lower concentration to give activity comparable to that obtained by the two step process. The concentration gradient of the vinyl aromatic polymer and the flame retardant in the final bead is controlled by the process conditions.

DETAILED DESCRIPTION OF THE INVENTION

The present invention provides a means for forming vinyl aromatic polymers which can be converted to foams with improved resistance to burning by polymerizing an emulsion of a vinyl aromatic monomer, containing a flame retardant and free-radical producing catalysts, which has been absorbed either near or at the surface, or more or less uniformly dispersed throughout pre-screened vinyl aromatic polymer beads.

The process comprises (a) forming an aqueous suspension of pre-screened, initial vinyl aromatic polymer beads with the aid of a suitable suspending agent system; (b) forming a solution of vinyl aromatic monomer and a flame retardant; (c) forming an emulsion comprising a suitable emulsifier and said solution with free-radical producing catalysts dissolved therein; (d) adding the emulsion to the initial polymer bead suspension at 25°–75° C. and allowing said beads to absorb the monomer, catalysts and flame retardant either near or at the surface of said beads or allow the beads to absorb and equilibrate so that the monomer, catalysts and flame retardant are more or less uniformly distributed throughout the beads; (e) heating the suspension to an intermediate polymerization temperature to give firm beads; (f) heating said bead suspension to a temperature of about 100° to about 135° C. to substantially complete the polymerization of said vinyl aromatic monomer; (g) optionally cooling the suspension to a temperature of 125° C. or less; (h) adding a blowing agent and heating to a temperature of between 80° and 135° C. to impregnate the beads; and (i) cooling the suspension to room temperature, acidifying the suspension with hydrochloric acid, and separating the beads from the aqueous system.

Step (d) of the process may be varied without detracting from the improvements obtained in the final product. For example, a portion of the emulsified monomer solution without dissolved catalyst may be added and allowed to be absorbed into the initial polymer beads, followed by the addition of the remaining monomer emulsion containing all of the dissolved catalysts. Conversely, a portion of the emulsified monomer solution containing dissolved catalysts may be added initially to the bead suspension, followed by the addition of the remaining emulsified monomer and flame retardant.

In the practice of this invention, any suitable thermoplastic homopolymer or copolymer can be employed. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer with monomers such as butadiene, alkyl methacrylates, alkyl acrylates, acrylonitrile, and maleic anhydride, wherein the vinyl aromatic monomer is present in at least 50% by weight of the copolymer. The preferred vinyl aromatic monomer is styrene.

The polymer useful in this invention must be in the form of beads, granules, or other particles convenient for the expansion and molding operations. Beads formed from an aqueous suspension process are essentially spherical. Because the particles are to be coated with an additional layer of polymer and flame retardant, the initial particles must be selected from those having a smaller bead size than ultimately desired.

The initial vinyl aromatic polymer beads are formed into a suspension in an aqueous medium by dispersing the beads in water containing a suitable suspending agent system. One such system may be a finely divided, difficultly watersoluble, inorganic phosphate suspending agent such as those described in Grim U.S. Pat. No. 2,673,194, and include tricalcium phosphate, hydroxyapatite, magnesium phosphate, and the like. Modifiers, such as sodium dodecylbenzene sulfonate can also be added as per the Grim patent. The amount of such suspension agent added is about 2.5–7.5 percent by weight of the final product, with about 4.5 percent by weight preferred. Another such system is a polyvinyl alcohol suspending agent, such as is sold under the trademark "Vinol 540'"", in an amount of 0.07–0.30 percent by weight, with a preferred amount of about 0.10 percent, based on the final product weight. Other organic suspending agent systems include hydroxyethyl cellulose and polyvinyl pyrrolidone. Equally useful systems employ combinations of inorganic and organic suspending agents, for example tricalcium phosphate and polyvinyl alcohol. Mixtures of these systems can also be used. The initial polymer beads may also have additional additives, such as internal fast-cool agents, pigments and dyes, stabilizers, anti-lump agents, self-extinguishing agents, plasticizers, and polymeric additives, such as minor amounts (0.05–0.50 wt-%) of polyethylene, polypropylene, and in particular, poly-waxes such as low molecular weight (Mn 650–1500) narrow MWD, crystalline (densities 0.93–0.96) polyethylenes and similar molecular weight Fisher-Tropsch waxes.

The vinyl aromatic monomers useful in the coating process are the same as used to prepare the initial vinyl aromatic polymer beads, namely styrene, alpha-methylstyrene, nuclear-methylstyrene, para-tert-butylstyrene, monochlorostyrene, dichlorostyrene, and mixtures thereof. The coating monomer may be the same one used to prepare the initial polymer beads, or may be different.

The flame retardants useful in the present invention are any of the halogenated aliphatic or aromatic hydrocarbons normally sold as flame retardants. The process is especially useful for those retardants which are difficultly soluble in the hydrocarbon blowing agents but have at least some solubility in the vinyl aromatic monomers. Examples of suitable flame retardant materials are 1,2-dibromo-4-(1,2dibromoethyl)cyclohexane, pentabromochlorocyclohexane, 1,1,2,3,4,4-hexabromo-2-butene, hexabromocyclododecane, the brominated arylidene ketones of U.S. Pat. No. 3,766,136; the brominated cinnamic acid esters of U.S. Pat. No. 3,766,249; and the brominated aryl butanes of U.S. Pat. No. 3,826,766. The aromatic flame retardants may be, for example, tribromophenyl allyl ether, pentabromophenyl allyl ether, and tetrabromobisphenol A bis(allyl ether). The amount of flame retardant added to the polymer particle will vary from 0.2 to about 10 wt-% depending on the particular flame retardant use. The coating process of the present invention allows less agent to be added to achieve the same effect as obtained with the one- or two-step processes of the early art. When lesser amounts of flame retardant are used, it is preferred to use from 0.1 to 2.0 wt-% of an organic peroxide to act as a synergist for the decomposition of the bromine compound. Suitable for the synergistic action are those organic peroxides which decompose at temperatures above 120° C. This limitation is necessary to prevent premature decomposition of the peroxide during the impregnation step. Useful examples are dicumyl peroxide, 2,5-dimethyl-2,5-di(tert-butylperoxy)hexane, 1,3-bis(alpha-tertbutyl peroxyisopropyl)benzene, di(3-tert-butylperoxy-1,3-dimethyl-butyl)carbonate, and 2,5-dimethyl-2,5-di(tertbutylperoxy)-3-hexyne.

The flame retardants are coated onto the polymer particles by the emulsion technique described in U.S. Pat. No. 4,622,346 to Di Giulio, which is incorporated hereby in its entirety. The technique comprises forming an aqueous suspension of initial styrene polymer beads and adding thereto an emulsion of vinyl aromatic monomer, divinylbenzene (if used), the flame retardant, and free-radical producing catalysts, and the suspension is heated to copolymerize the vinyl aromatic monomer and other additives onto and within the initial beads to form modified beads. There is prepared a solution of a vinyl aromatic monomer and a flame retardant. The amount of vinyl aromatic monomer and flame retardant present in the solution will depend upon the amount of the polymer to be dispersed in and on the initial vinyl aromatic polymer beads but they may be applied in concentrations of 1 to 35 weight percent based on total beads.

This solution containing dissolved catalysts is then converted to an emulsion by the addition thereto of a suitable emulsifier. The suitable emulsifiers to form the emulsion of vinyl aromatic monomer and the flame retardant may be the sodium alkylbenzene sulfonates, such as dodecylbenzene sulfonate, as well as the various nonionic surfactants comprising polyoxyethylene mono-ethers and mono-esters, such as polyoxyethylene sorbitan monolaurate, wherein the polyoxyethylene portion may have from 20 to 50 moles of ethylene oxide. Examples of the mono-ethers are the ethylene oxide condensates of octyl or nonylphenol.

The catalysts are a mixture of at least two free radical type materials comprising a primary low-temperature initiator having a 10-hour half-life temperature of between 60° and 80° C. and a secondary high-temperature initiator having a 10-hour half-life temperature of between 85° and 110° C. Thus, a mixture of benzoyl peroxide and t-butyl perbenzoate which have 10-hour half-life temperature of 73° and 105° C., respectively, can be used. Azo catalysts having suitable 10-hour half-life temperatures are also useful.

The aqueous emulsion of monomer, catalyst and flame retardant is added continuously to the aqueous suspension of vinyl aromatic polymer beads over a period of about 0.30–2.5 hours, while heating the suspension with stirrring, at a temperature of between 25° and 75° C. and maintaining that temperature during the addition. The suspension of vinyl aromatic polymer beads containing absorbed monomer, catalyst and flame retardant may then be either heated to an intermediate temperature of about 80°–95° C. over a period of 10–45 minutes directly after the addition of the emulsion is complete or it may be allowed to stand at 25°–75° C. for various time periods to permit the absorbed emulsion to diffuse more or less uniformly throughout the beads before heating to the intermediate temperature. Then the suspension is further heated at the intermediate temperature until the beads are firm, or for a period of 0.10–6.0 hours. The morphology of the resulting modified beads can be varied during this monomer addition stage and polymerization to firm beads and will be dependent on a number of factors such as the rate of emulsion addition, temperature at the time of addition, and the time interval before the temperature is increased to produce a significant polymerization rate. The morphology therefore may be varied wherein the monomer, catalyst and flame retardant may be more or less concentrated toward the surface, as a consequence of fairly rapid addition and rapid attainment of significant polymerization rate to obtain firm beads, or they may be more or less uniformly dispersed throughout the bead, as a consequence of the length of time allowed for absorption and equilibration of the monomer, catalysts and flame retardant in the initial polymer bead to occur before permitting significant polymerization to form firm beads.

After heating at the intermediate temperature of about 80°–95° C. has been completed, the suspension is then further heated, such as for four hours at 115° C. or one to three hours at 135° C., to reduce the amount of unpolymerized monomer to less than 0.25%, preferably less than 0.05%.

Alternatively, the monomer solution can be divided into two portions, with the catalysts and flame retardant added to one portion only. For example, the portion with no catalyst or flame retardant may consist of approximately ⅔ of the total solution and, after emulsification, is added at any desired temperature between 25° and 75° C. to the suspended initial polymer beads. The remaining ⅓ of the solution containing all of the catalysts and flame retardant is emulsified, and added to the suspension at the same temperature or a different temperature. A further alternative could be the addition of the catalysts and flame retardant containing portion first, followed by the addition of the portion not containing any additive.

Again, the rate of addition may be rapid or slow, and the absorption equilibrium times may be varied in order to control the morphology in the final bead product. The monomer, catalysts and flame retardant absorbed on or in the vinyl aromatic polymer beads are then polymerized at the intermediate temperatures of about 80°–95° C. and finished off at between 100° and 135° C. as before.

The polymer particles are impregnated using any conventional method with a suitable blowing agent. For example, the impregnation can be achieved by adding the blowing agent to the aqueous suspension during the polymerization of the monomers, or alternatively by resuspending the polymer particles in an aqueous medium and then incorporating the blowing agent as taught in U.S. Pat. No. 2,983,692 to D'Alelio. Any gaseous material or material which will produce a gas on heating can be used as the blowing agent. Conventional blowing agents include aliphatic hydrocarbons containing 4 to 6 carbon atoms in the molecule, such as butanes, pentanes, hexanes, and the halogenated hydrocarbons which boil at a temperature below the softening point of the polymer chosen. Mixtures of these blowing agents can also be used.

EXAMPLE I

A series of runs were carried out as follows:

An initial polystyrene bead slurry was prepared in a 2-liter resin kettle having an agitator, reflux condenser, combination baffle/thermometer wells and a monomer feed port, by adding thereto 440 g of distilled water, 27.72 g of tricalcium phosphate and 484 g of polystyrene beads of through 25 mesh and on 45 mesh bead size (U.S. Standard Sieve). The slurry was heated, with stirring at 400 rpm, to 70° C. and maintained at that temperature.

A comonomer solution was formed by mixing 132 g of styrene, 0.462 g of benzoyl peroxide, 0.087 g of tert-butyl perbenzoate, 0.616 g of tert-butyl catechol, 1.232 g of 1,3-bis-(alpha-tert-butyl peroxyisopropyl)benzene and 5.131 g of pentabromochlorocyclohexane. The solution was stirred magnetically until most of the ingredients dissolved.

An emulsion was prepared by the addition of the comonomer solution to a solution of 21.65 ml of a 1% solution of sodium dodecylbenzene sulfonate and 0.616 g of polyoxyethylene(20)sorbitan monolaurate in 148 g of distilled water. The mixture was mixed for 1 minute using a Polytron high intensity stirrer.

The emulsion was added continuously over a 30 minute period to the stirred 2-liter resin flask being maintained at 70° C. The suspension was heated to 90° C. and kept at that temperature for 90 minutes. The temperature was raised to 125° C. and the reactor kept at that temperature for 2 hours.

The suspension was cooled to 105° C. and 49.28 g of n-pentane was added over a period of 90 minutes. After holding the temperature at 105° C. for an additional 30 minutes, the contents were cooled to 35° C. The suspension was acidified to pH 1 by the addition of concentrated HCl and the beads were centrifuged, washed with water and tray dried.

The beads were pre-expanded by heating for 2 minutes in steam to give prepuff having a bulk density of between 0.9 and 1.8 pounds per cubic foot (pcf).

The pre-expanded beads were vacuum charged to a 2"×8" diameter preheated mold cavity. The beads were fused at about 115° C. for 5–10 seconds in the mold, and the part was cooled by circulating water in the mold.

A number of 1×6×½ inch specimens were cut from the resulting foam disc and conditioned at 60° C. under vacuum for 16 hours. The specimen was hung lengthwise from a clamp and a microburner having a ¾ inch yellow flame was used to contact the bottom edge of the foam sample for 3 seconds. The average vertical burn time (time from withdrawal of the flame to flame-out of the foam) for 5 samples was determined. The foam containing the pentabromochlorocyclohexane coating had a zero burn time compared to greater than 0.5 second burn time for various flame retardants added by the one- or two-step process.

EXAMPLE II

The procedure of Example I was repeated using hexabromocyclododecane in place of the pentabromochlorocyclohexane. The incorporation of the flame retardant was found to be much more efficient by the coating process than with the impregnation process. Thus, the hexabromocyclododecane was incorporated 85 wt-% compared to only about 35 wt-% by the impregnation process. Further, the coated beads required about 40 wt-% less of the flame retardant than that needed in the impregnated beads to achieve the comparable effect.

Similar results would be obtained using 1,2-dibromo-4-(1,2-dibromoethyl)cyclohexane or tetrabromobisphenol A bis(allyl ether) as flame retardant.

I claim:

1. The process for preparing a fire-retardant foam composition comprising:
   (a) forming an aqueous suspension of initial vinyl aromatic polymer beads with the aid of a suitable suspending agent system;
   (b) forming a monomer solution of vinyl aromatic monomer, free-radical producing catalysts, and flame retardant agent;
   (c) forming an emulsion by adding a suitable emulsifier to the monomer solution;
   (d) adding the emulsion to the suspension of beads at 25°–75° C.;

(e) immediately heating the suspension to about 80°–95° C., and maintaining said temperature for 0.10 to 6 hours to polymerize said monomers;

(f) heating said suspension to a temperature of from 100° to about 135° C. for sufficient time to substantially complete the polymerization of the vinyl aromatic monomer to form beads having the vinyl aromatic polymer and the flame retardant diffused throughout but distributed primarily at or near the surface of the bead;

(g) optionally cooling the suspension to about 125° C. or less;

(h) adding a non-ionic surfactant and 3–12% of a blowing agent;

(i) heating the whole at a temperature of between 80° and 135° C. to impregnate the beads with the blowing agent; and (j) cooling the suspension to room temperature, acidifying the suspension, and separating the impregnated beads from the aqueous system.

2. The process of claim 1 wherein said initial vinyl aromatic polymer beads are selected from the group consisting of polymers of styrene, isopropylstyrene, alpha-methylstyrene, nuclear methylstyrenes, chlorostyrenes, tert-butylstyrene, and copolymers of at least one vinyl aromatic monomer with up to 50% by weight of a monomer copolymerizable therewith.

3. The process of claim 1 wherein said suitable suspending agent system is tricalcium phosphate suspending agent in conjunction with sodium dodecylbenzene sulfonate surfactant and polyoxyethylene(20)sorbitan monolaurate nonionic surfactant.

4. The process of claim 1 wherein said vinyl aromatic monomer is selected from the group consisting of styrene, alpha-methylstyrene, nuclear-methylstyrene, para-tertbutylstyrene, monochlorostyrene, dichlorostyrene, and mixtures thereof.

5. The process of claim 1 wherein said free-radical producing catalysts are soluble in styrene and a primary catalyst is selected from a group with a 10-hour half-life temperature of 60° to 80° C. and a secondary catalyst is selected from a group with a 10-hour half-life temperature of 85° to 110° C.

6. The process of claim 1 wherein said flame retardant is a halogenated aliphatic or aromatic hydrocarbon.

7. The process of claim 1 wherein said flame retardant is pentabromochlorocyclohexane.

8. The process of claim 1 wherein said flame retardant is hexabromocyclododecane.

9. The process of claim 1 wherein said flame retardant is 1,2-dibromo-4-(1,2-dibromoethyl)cyclohexane.

10. The process of claim 1 wherein said flame retardant is tetrabromobisphenol A bis(allyl ether).

11. The process of claim 1 wherein said suitable emulsifier is sodium dodecylbenzene sulfonate.

12. The process of claim 1 including the step of adding 0.1 to 2.0 parts of an organic peroxide synergist to the monomer solution with the flame retardant.

13. The process of claim 1 wherein said blowing agent is selected from the group consisting of aliphatic hydrocarbons containing 4–6 carbon atoms, halogenated hydrocarbons which boil at a temperature below the softening point of the polymer and mixtures of these.

14. The process for preparing a fire-retardant foam composition comprising:

(a) forming an aqueous suspension of initial vinyl aromatic polymer beads with the aid of a suitable suspending agent system;

(b) forming a monomer solution of vinyl aromatic monomer and flame retardant agent;

(c) forming an emulsion by adding a suitable emulsifier to a portion of the monomer solution;

(d) adding the emulsion to the suspension of beads at 25°–75° C. to allow the monomer and flame retardant to be absorbed into said beads from said emulsion;

(e) forming a second emulsion by adding an emulsifier to the remaining portion of the monomer solution, and free-radical producing catalysts;

(f) adding the second emulsion to the suspension of said beads absorbed with monomer and flame retardant at 25°–75° C., at a rate such that the rate of absorption of monomer/catalyst by said beads is at least equivalent to the rate of addition of emulsified monomer/catalyst solution, and shortly after the addition is completed, heating the resulting bead suspension to about 80°–95° C., and maintaining said temperature for 0.10 to 6 hours to polymerize the monomer;

(g) heating said suspension to a temperature of from 100° to about 135° C. for sufficient time to substantially complete the polymerization of the vinyl aromatic monomer to form beads having the vinyl aromatic polymer and the flame retardant diffused throughout but distributed primarily at or near the surface of the bead;

(h) optionally cooling the suspension to about 125° C. or less;

(i) adding a non-ionic surfactant and 3–12% of a blowing agent;

(j) heating the whole at a temperature of between 80° and 135° C. to impregnate the beads with the blowing agent; and (k) cooling the suspension to room temperature, acidifying the suspension, and separating the impregnated beads from the aqueous system.

15. The process of claim 14 wherein said initial vinyl aromatic polymer beads are selected from the group consisting of polymers of styrene, isopropylstyrene, alpha-methylstyrene, nuclear methylstyrenes, chlorostyrenes, tert-butylstyrene, and copolymers of at least one vinyl aromatic monomer with up to 50% by weight of a monomer copolymerizable therewith.

16. The process of claim 14 wherein said suitable suspending agent system is tricalcium phosphate suspending agent in conjunction with sodium dodecylbenzene sulfonate surfactant and polyoxyethylene(20)sorbitan monolaurate nonionic surfactant.

17. The process of claim 14 wherein said vinyl aromatic monomer is selected from the group consisting of styrene, alpha-methylstyrene, nuclear-methylstyrene, para-tertbutylstyrene, monochlorostyrene, dichlorostyrene, and mixtures thereof.

18. The process of claim 14 wherein said free-radical producing catalysts are soluble in styrene and a primary catalyst is selected from a group with a 10-hour half-life temperature of 60° to 80° C. and a secondary catalyst is selected from a group with a 10-hour half-life temperature of 85° to 110° C.

19. The process of claim 14 wherein said flame retardant is a halogenated aliphatic or aromatic hydrocarbon.

20. The process of claim 14 wherein said flame retardant is pentabromochlorocyclohexane.

21. The process of claim 14 wherein said flame retardant is hexabromocyclododecane.

22. The process of claim 14 wherein said flame retardant is 1,2-dibromo-4-(1,2-dibromoethyl)cyclohexane.

23. The process of claim 14 wherein said flame retardant is tetrabromobisphenol A bis(allyl ether).

24. The process of claim 14 wherein said suitable emulsifier is sodium dodecylbenzene sulfonate.

25. The process of claim 14 including the step of adding 0.1 to 2.0 parts of an organic peroxide synergist to the monomer solution with the flame retardant.

26. The process of claim 14 wherein said blowing agent is selected from the group consisting of aliphatic hydrocarbons containing 4–6 carbon atoms, halogenated hydrocarbons which boil at a temperature below the softening point of the polymer and mixtures of these.

27. The process for preparing a fire-retardant foam composition comprising:
(a) forming an aqueous suspension of initial vinyl aromatic polymer beads with the aid of a suitable suspending agent system;
(b) forming a monomer solution of vinyl aromatic monomer, free-radical producing catalysts, and flame retardant agent;
(c) forming an emulsion by adding a suitable emulsifier to the monomer solution;
(d) adding the emulsion to the suspension of beads at 25°–75° C. and allowing to stand for 30 minutes to 4 hours to allow the monomer, catalysts and flame retardant to be absorbed into the beads;
(e) heating the suspension to about 80°–95° C., and maintaining said temperature for 0.10 to 6 hours to polymerize said monomers;
(f) heating said suspension to a temperature of from 100° to about 135° C. for sufficient time to substantially complete the polymerization of the vinyl aromatic monomer to form beads having the vinyl aromatic polymer and the flame retardant relatively uniformly distributed throughout the beads;
(g) optionally cooling the suspension to about 125° C. or less;
(h) adding a non-ionic surfactant and 3–12% of a blowing agent;
(i) heating the whole at a temperature of between 80° and 135° C. to impregnate the beads with the blowing agent; and
(j) cooling the suspension to room temperature, acidifying the suspension, and separating the impregnated beads from the aqueous system.

28. The process of claim 27 wherein said initial vinyl aromatic polymer beads are selected from the group consisting of polymers of styrene, isopropylstyrene, alpha-methylstyrene, nuclear methylstyrenes, chlorostyrenes, tert-butylstyrene, and copolymers of at least one vinyl aromatic monomer with up to 50% by weight of a monomer copolymerizable therewith.

29. The process of claim 27 wherein said suitable suspending agent system is tricalcium phosphate suspending agent in conjunction with sodium dodecylbenzene sulfonate surfactant and polyoxyethylene(20)sorbitan monolaurate nonionic surfactant.

30. The process of claim 27 wherein said vinyl aromatic monomer is selected from the group consisting of styrene, alpha-methylstyrene, nuclear-methylstyrene, para-tertbutylstyrene, monochlorostyrene, dichlorostyrene, and mixtures thereof.

31. The process of claim 27 wherein said free-radical producing catalysts are soluble in styrene and a primary catalyst is selected from a group with a 10-hour half-life temperature of 60° to 80° C. and a secondary catalyst is selected from a group with a 10-hour half-life temperature of 85° to 110° C.

32. The process of claim 27 wherein said flame retardant is a halogenated aliphatic or aromatic hydrocarbon.

33. The process of claim 27 wherein said flame retardant is pentabromochlorocyclohexane.

34. The process of claim 27 wherein said flame retardant is hexabromocyclododecane.

35. The process of claim 27 wherein said flame retardant is 1,2-dibromo-4-(1,2-dibromoethyl)cyclohexane.

36. The process of claim 27 wherein said flame retardant is tetrabromobisphenol A bis(allyl ether).

37. The process of claim 27 wherein said suitable emulsifier is sodium dodecylbenzene sulfonate.

38. The process of claim 27 including the step of adding 0.1 to 2.0 parts of an organic peroxide synergist to the monomer solution with the flame retardant.

39. The process of claim 27 wherein said blowing agent is selected from the group consisting of aliphatic hydrocarbons containing 4–6 carbon atoms, halogenated hydrocarbons which boil at a temperature below the softening point of the polymer and mixtures of these.

40. The process for preparing a fire-retardant foam composition comprising:
(a) forming an aqueous suspension of initial vinyl aromatic polymer beads with the aid of a suitable suspending agent system;
(b) forming a monomer solution of vinyl aromatic monomer and flame retardant agent;
(c) forming an emulsion by adding a suitable emulsifier to a portion of the monomer solution;
(d) adding the emulsion to the suspension of beads at 25°–75° C. to allow the monomer and flame retardant to be absorbed into said beads from said emulsion;
(e) forming a second emulsion by adding an emulsifier to the remaining portion of the monomer solution, and free-radical producing catalysts;
(f) adding the second emulsion to the suspension of said beads absorbed with monomer and flame retardant at 25–75° C., at a rate such that the rate of absorption of monomer/catalyst by said beads is at least equivalent to the rate of addition of emulsified monomer/catalyst solution, and then allowing the suspension to stand for 30 minutes to 4 hours to allow the monomer, catalysts and flame retardant to be absorbed into the beads;
(g) heating the resulting bead suspension to about 80°–95°C., and maintaining said temperature for 0.10 to 6 hours to polymerize the monomer;
(h) heating said suspension to a temperature of from 100° to about 135° C. for sufficient time to substantially complete the polymerization of the vinyl aromatic monomer to form beads having the vinyl aromatic polymer and the flame retardant relatively uniformly dispersed throughout the beads;
(i) optionally cooling the suspension to about 125° C. or less;
(j) adding a non-ionic surfactant and 3–12% of a blowing agent;

(k) heating the whole at a temperature of between 80° and 135° C. to impregnate the beads with the blowing agent; and (l) cooling the suspension to room temperature, acidifying the suspension, and separating the impregnated beads from the aqueous system.

41. The process of claim 40 wherein said initial vinyl aromatic polymer beads are selected from the group consisting of polymers of styrene, isopropylstyrene, alpha-methylstyrene, nuclear methylstyrenes, chlorostyrenes, tert-butylstyrene, and copolymers of at least one vinyl aromatic monomer with up to 50% by weight of a monomer copolymerizable therewith.

42. The process of claim 40 wherein said suitable suspending agent system is tricalcium phosphate suspending agent in conjunction with sodium dodecylbenzene sulfonate surfactant and polyoxyethylene(20)sorbitan monolaurate nonionic surfactant.

43. The process of claim 40 wherein said vinyl aromatic monomer is selected from the group consisting of styrene, alpha-methylstyrene, nuclear-methylstyrene, para-tertbutylstyrene, monochlorostyrene, dichlorostyrene, and mixtures thereof.

44. The process of claim 40 wherein said free-radical producing catalysts are soluble in styrene and a primary catalyst is selected from a group with a 10-hour half-life temperature of 60° to 80° C. and a secondary catalyst is selected from a group with a 10-hour half-life temperature of 85° to 110° C.

45. The process of claim 40 wherein said flame retardant is a halogenated aliphatic or aromatic hydrocarbon.

46. The process of claim 40 wherein said flame retardant is pentabromochlorocyclohexane.

47. The process of claim 40 wherein said flame retardant is hexabromocyclododecane.

48. The process of claim 40 wherein said flame retardant is 1,2-dibromo-4-(1,2-dibromoethyl)cyclohexane.

49. The process of claim 40 wherein said flame retardant is tetrabromobisphenol A bis(allyl ether).

50. The process of claim 40 wherein said suitable emulsifier is sodium dodecylbenzene sulfonate.

51. The process of claim 40 including the step of adding 0.1 to 2.0 parts of an organic peroxide synergist to the monomer solution with the flame retardant.

52. The process of claim 40 wherein said blowing agent is selected from the group consisting of aliphatic hydrocarbons containing 4–6 carbon atoms, halogenated hydrocarbons which boil at a temperature below the softening point of the polymer and mixtures of these.

* * * * *